US012346050B2

(12) United States Patent
Okada et al.

(10) Patent No.: US 12,346,050 B2
(45) Date of Patent: Jul. 1, 2025

(54) IMAGE FORMING APPARATUS

(71) Applicant: KYOCERA Document Solutions Inc., Osaka (JP)

(72) Inventors: Masataka Okada, Osaka (JP); Masaki Kadota, Osaka (JP); Yuji Kamiyama, Osaka (JP)

(73) Assignee: KYOCERA Document Solutions Inc, Osaka (JP)

( * ) Notice: Subject to any disclaimer, the term of this patent is extended or adjusted under 35 U.S.C. 154(b) by 0 days.

(21) Appl. No.: 18/760,382

(22) Filed: Jul. 1, 2024

(65) Prior Publication Data

US 2025/0013181 A1 Jan. 9, 2025

(30) Foreign Application Priority Data

Jul. 5, 2023 (JP) ................................ 2023-110634

(51) Int. Cl.
*G03G 15/00* (2006.01)

(52) U.S. Cl.
CPC ..... *G03G 15/5008* (2013.01); *G03G 15/5054* (2013.01); *G03G 2215/0008* (2013.01)

(58) Field of Classification Search
CPC .......... G03G 15/5008; G03G 15/5054; G03G 2215/0008; G03G 15/50; G03G 15/55
See application file for complete search history.

(56) References Cited

U.S. PATENT DOCUMENTS

2016/0195842 A1* 7/2016 Tanaka .................. G03G 15/55 399/48
2017/0212467 A1* 7/2017 Iriyama ................. G03G 15/55

FOREIGN PATENT DOCUMENTS

JP 2011-128345 A 6/2011

* cited by examiner

*Primary Examiner* — Sandra Brase
(74) *Attorney, Agent, or Firm* — Stein IP, LLC

(57) ABSTRACT

An image forming apparatus includes an image carrier, a charging device, an exposure device, a developing device, a transfer portion, a cleaning blade, and a control section. The control section detects a charging current amount of the image carrier and, when an integrated current amount obtained by integrating values of the charging current amount in a prescribed length of time is lower than a prescribed threshold value, performs an aging process in which the image carrier is driven to rotate in a charged state.

4 Claims, 5 Drawing Sheets

IMAGE FORMING APPARATUS

INCORPORATION BY REFERENCE

This application is based upon and claims the benefit of priority from Japanese Patent Application No. 2023-110634 filed on Jul. 5, 2023, the entire contents of which are incorporated herein by reference.

BACKGROUND

The present disclosure relates to an image forming apparatus using an electrophotographic process, and particularly to uniformizing a surface potential of an image carrier.

A conventional image forming apparatus employing an electrophotographic method includes an image carrier (a photosensitive member), a charging portion, an LSU (laser scanning unit), a developing portion, and a fixing portion. Upon an input of an instruction to perform image formation, the image carrier having a cylindrical shape rotates, and a surface of the image carrier is charged by the charging portion. The charged surface of the image carrier is exposed to light by the LSU so that an electrostatic latent image is formed thereon. The electrostatic latent image is developed into a toner image by the developing portion. The toner image thus formed on the surface of the image carrier is transferred to a sheet via an intermediate transfer belt. After that, the image is fixed onto the sheet by the fixing portion. Residual toner remaining on the image carrier is scraped off by a blade.

SUMMARY

An image forming apparatus of the present disclosure includes an image carrier, a charging device, an exposure device, a developing device, a transfer portion, a cleaning blade, and a control section. The image carrier includes a photosensitive layer provided on a surface thereof and is driven to rotate. The surface of the image carrier is charged by the charging device. The exposure device exposes the charged surface of the image carrier to light so that an electrostatic latent image is formed thereon. The developing device develops the electrostatic latent image into a toner image. The toner image on the image carrier is transferred to a recording medium by the transfer portion, and thus an image is formed on the recording medium. The cleaning blade scrapes off residual toner remaining on the image carrier. The control section detects a charging current amount of the image carrier and, when an integrated current amount obtained by integrating values of the charging current amount in a prescribed length of time is lower than a prescribed threshold value, performs an aging process in which the image carrier is driven to rotate in a charged state.

Further features of the present disclosure and specific advantages obtained by the present disclosure will become more apparent from the description of an embodiment given below.

DETAILED DESCRIPTION

With reference to the appended drawings, the following describes an embodiment of the present disclosure, explaining first a problem with the conventional image forming apparatus.

In the conventional image forming apparatus, for example, using a driving time and a charging current of the image carrier, a degree of film abrasion of the surface of the image carrier is calculated at regular intervals, and a charging bias is shifted based on a result of the calculation. Thus, high-quality images can be formed over a long period of time.

In the above-described conventional image forming apparatus, however, an insufficient degree of film abrasion of the image carrier caused by the blade might lead to a failure to remove substances adhering to the surface of the image carrier, resulting in occurrence of an image defect, such as white spots or color spots, or breakdown. Particularly in an initial stage in which a photosensitive layer on the surface of the image carrier has a large film thickness, the surface of the image carrier is characteristically unlikely to be abraded.

Consequently, for example, when insulating foreign matter remains on a part of the surface of the image carrier, the image carrier has a surface potential increased only in that part. This leads to a failure to accurately calculate, based on the charging current, the degree of film abrasion of the surface of the image carrier, making it impossible to form uniform images.

In view of the above-described problem, it is an object of the present disclosure to provide an image forming apparatus capable of preventing occurrence of an image defect or breakdown so as to obtain uniform images.

Figure 1:
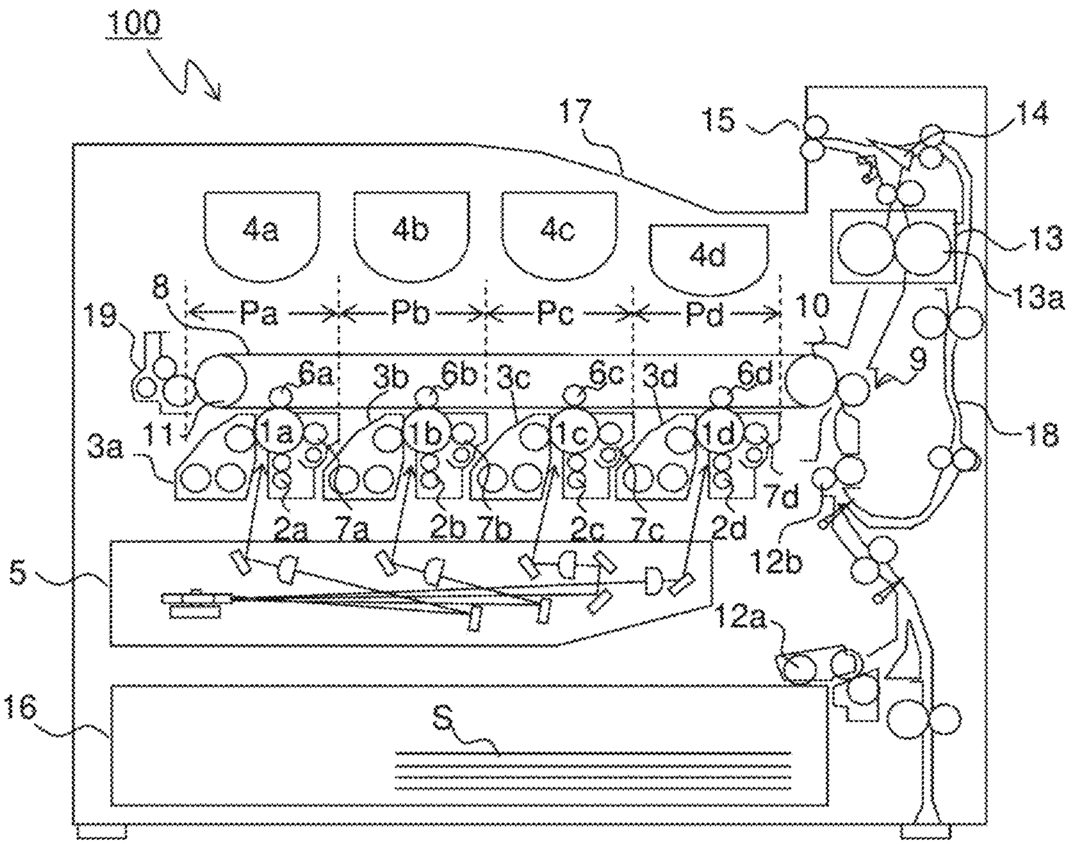
FIG. 1 is a schematic view showing an internal configuration of an image forming apparatus according to an embodiment of the present disclosure.
Figure 2:
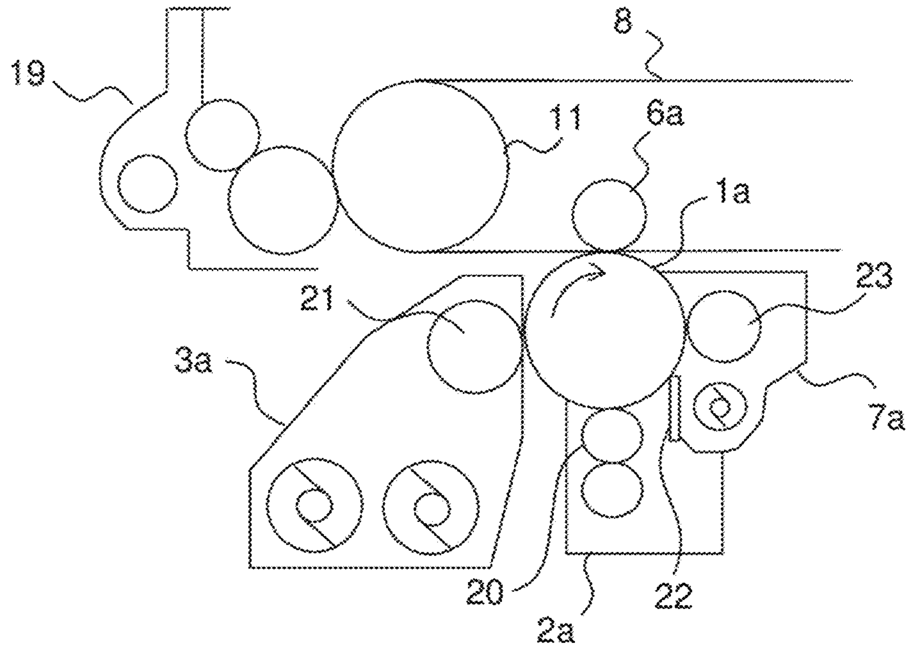
FIG. 2 is an enlarged view of a vicinity of an image forming portion shown in FIG. 1.

FIG. 1 is a schematic view showing a configuration of an image forming apparatus 100 according to an embodiment of the present disclosure, and FIG. 2 is an enlarged view of a vicinity of an image forming portion Pa shown in FIG. 1.

The image forming apparatus 100 shown in FIG. 1 is a so-called tandem color printer and has the following configuration. That is, in a main body of the image forming apparatus 100, four image forming portions Pa, Pb, Pc, and Pd are provided in this order from upstream in a conveyance direction (a left side in FIG. 1). The image forming portions Pa to Pd are provided so as to correspond to images of four different colors (yellow, cyan, magenta, and black), respectively, and individually perform steps of charging, exposure, development, and transfer so as to sequentially form images of yellow, cyan, magenta, and black, respectively.

In the image forming portions Pa to Pd, there are respectively provided photosensitive drums 1*a*, 1*b*, 1*c*, and 1*d* (image carriers) bearing visible images (toner images) of the respective colors. Each of the photosensitive drums 1*a* to 1*d* is formed of a positively charged single-layer organic photosensitive member and has a photosensitive layer on a surface thereof. Moreover, an intermediate transfer belt 8 that rotates in a counterclockwise direction in FIG. 1 is provided adjacently to the image forming portions Pa to Pd. The toner images formed on the photosensitive drums 1*a* to 1*d* are sequentially transferred onto the intermediate transfer belt 8 moving while abutting on the photosensitive drums 1*a* to 1*d*.

After that, by a secondary transfer roller 9, the toner images on the intermediate transfer belt 8 are transferred onto a sheet S that is an example of a recording medium. After the toner images have been fixed to the sheet S in a fixing portion 13, the sheet S is discharged from the main body of the image forming apparatus 100. An image forming process with respect to the photosensitive drums 1*a* to 1*d* is executed while the photosensitive drums 1*a* to 1*d* are rotated in a clockwise direction in FIG. 1.

The sheet S to which toner images are to be transferred is contained in a sheet cassette 16 in a lower part of the main body of the image forming apparatus 100 and is conveyed to the secondary transfer roller 9 via a paper feed roller 12*a* and a registration roller pair 12*b*. As the intermediate transfer belt 8, a (seamless) belt having no seam is primarily used.

Next, a description is given of the image forming portions Pa to Pd. While the following describes the image forming portion Pa in detail, the image forming portions Pb to Pd are basically similar in configuration thereto, and duplicate descriptions thereof, therefore, are omitted. As shown in FIG. 2, around the photosensitive drum 1*a*, a charging device 2*a*, a developing device 3*a*, and a cleaning device 7*a* are provided along a drum rotation direction (a clockwise direction in FIG. 2), and a primary transfer roller 6*a* is arranged to face the photosensitive drum 1*a* via the intermediate transfer belt 8. Furthermore, a belt cleaning unit 19 is arranged upstream from the photosensitive drum 1*a* in a rotation direction of the intermediate transfer belt 8. The belt cleaning unit 19 is opposed to a tension roller 11 via the intermediate transfer belt 8.

An exposure device 5 is arranged below the image forming portions Pa to Pd. The exposure device 5 is formed of a laser scanning unit (LSU) and includes a light source such as a semiconductor laser, a scanning mirror such as a polygon mirror, and an optical component such as a lens. Beam light emitted from the light source is scanned over each of the photosensitive drums 1*a* to 1*d*.

Next, a description is given of an image forming procedure performed in the image forming apparatus 100. Upon an input, by a user, of an instruction to start image formation, the photosensitive drums 1*a* to 1*d* are driven to rotate by a main motor 61 (see FIG. 3). The respective surfaces of the rotating photosensitive drums 1*a* to 1*d* are each uniformly charged by a charging roller 20 of a corresponding one of the charging devices 2*a* to 2*d*. Then, the surfaces of the photosensitive drums 1*a* to 1*d* are each scanned and irradiated with beam light (laser light) emitted from the exposure device 5. Thus, based on an image signal, electrostatic latent images with attenuated electrostatic charge are formed on the photosensitive drums 1*a* to 1*d*.

The developing devices 3*a* to 3*d* are loaded with prescribed amounts of toner of the respective colors of yellow, cyan, magenta, and black. When, as a result of after-mentioned formation of toner images, a proportion of the toner in a two-component developer loaded in each of the developing devices 3*a* to 3*d* falls below a preset value, the each of the developing devices 3*a* to 3*d* is replenished with a fresh supply of toner from a corresponding one of toner containers 4*a* to 4*d*. By a developing roller 21 of each of the developing devices 3*a* to 3*d*, the toner in the developer is supplied onto a corresponding one of the photosensitive drums 1*a* to 1*d* and electrostatically adheres thereto. Thus, there are formed toner images corresponding to the electrostatic latent images formed through exposure by the exposure device 5.

Further, by the primary transfer rollers 6*a* to 6*d*, electric fields are applied at a prescribed transfer voltage between themselves and the photosensitive drums 1*a* to 1*d* so that the toner images of yellow, cyan, magenta, and black on the photosensitive drums 1*a* to 1*d* are primarily transferred onto the intermediate transfer belt 8. These four images are formed in a positional relationship predetermined for formation of a prescribed full-color image. After that, residual toner remaining on each of the surfaces of the photosensitive drums 1*a* to 1*d* is scraped off to be removed by a cleaning blade 22 and a rubbing roller 23 in a corresponding one of the cleaning devices 7*a* to 7*d*. Thus, the photosensitive drums 1*a* to 1*d* are made ready for subsequent formation of new electrostatic latent images.

As a driving roller 10 is driven to rotate by a belt driving motor 63 (see FIG. 3), the intermediate transfer belt 8 starts to rotate in the counterclockwise direction. When the intermediate transfer belt 8 rotates, the sheet S is conveyed, at prescribed timing, from the registration roller pair 12*b* to the secondary transfer roller 9 provided adjacently to the intermediate transfer belt 8. By the secondary transfer roller 9, the toner images of full colors are transferred to the sheet S. Accordingly, the primary transfer rollers 6*a* to 6*d*, the intermediate transfer belt 8, and the secondary transfer roller 9 constitute a transfer portion that transfers toner images on the photosensitive drums 1*a* to 1*d* to a recording medium (the sheet S).

The sheet S to which the toner images have been transferred is conveyed to the fixing portion 13. Residual toner remaining on a surface of the intermediate transfer belt 8 is removed by the belt cleaning unit 19. The sheet S conveyed to the fixing portion 13 is heated and pressed by a fixing roller pair 13*a* so that the toner images are fixed to a surface thereof to form a full-color image thereon. By a branch portion 14 branching off in a plurality of directions, a conveyance direction of the sheet S on which the full-color image has been formed is controlled depending on whether or not duplex printing is to be performed. The sheet S is, directly or after being conveyed to a duplex conveyance path 18 and subjected to the duplex printing, discharged to a discharge tray 17 by a discharge roller pair 15.

Figure 3:
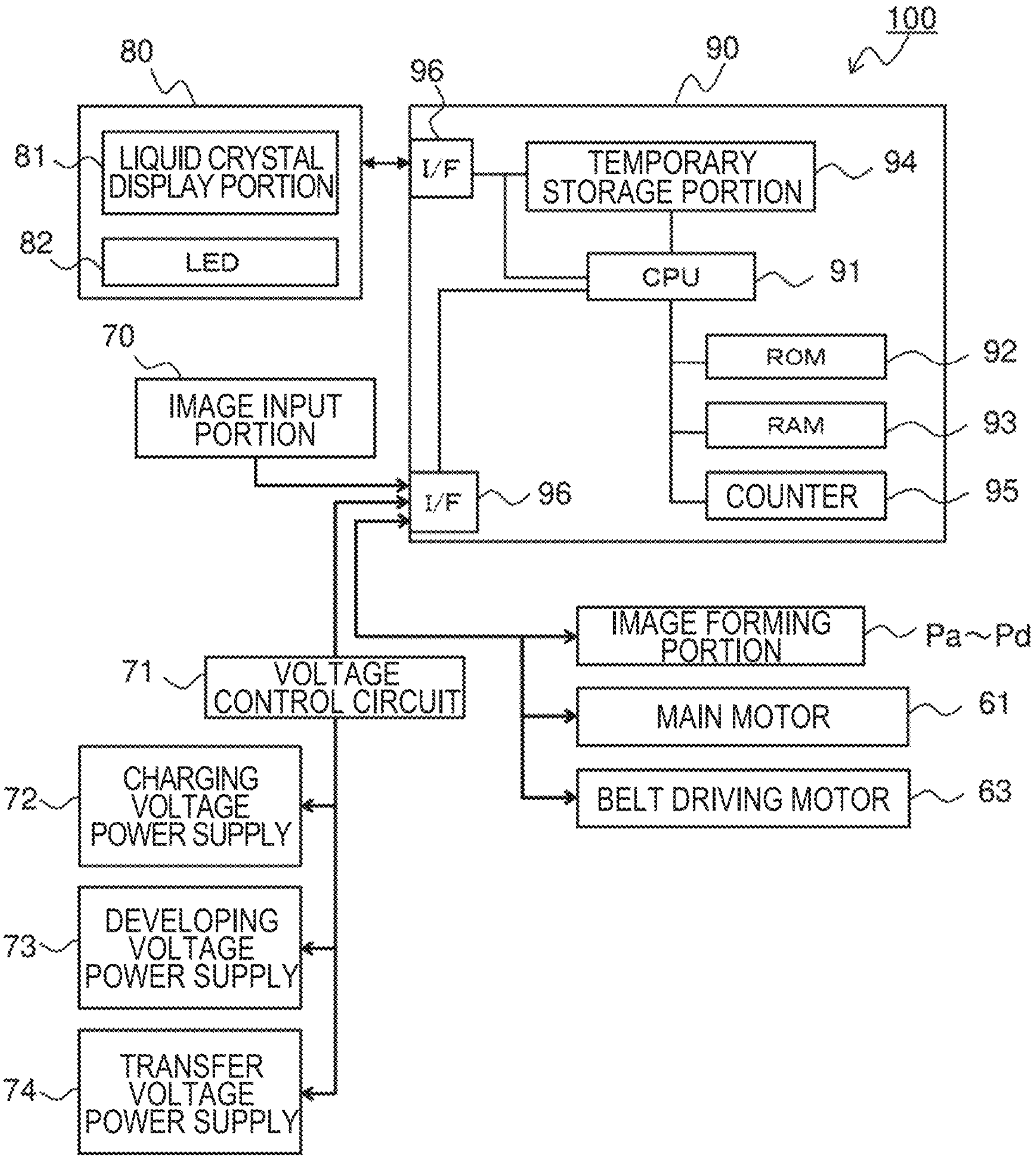
FIG. 3 is a block diagram showing an example of control paths used in the image forming apparatus of the embodiment of the present disclosure.

FIG. 3 is a block diagram showing an example of control paths used in the image forming apparatus 100 of this embodiment. In using the image forming apparatus 100, various portions thereof are controlled in different ways across complicated control paths all over the image forming apparatus 100. The following description, therefore, focuses on those control paths which are necessary for implementing the present disclosure.

A control section 90 includes a CPU 91 as a central arithmetic processor, a ROM 92 that is a read-only storage portion, a RAM 93 that is a readable/writable storage portion, a temporary storage portion 94 that temporarily stores image data and so on, a counter 95, and a plurality of (herein, two) I/Fs (interfaces) 96 that transmit control signals to various devices in the image forming apparatus 100 and receive an input signal from an operation section 80. Furthermore, the control section 90 can be arranged at any location inside the main body of the image forming apparatus 100.

The ROM 92 contains data and so on not to be changed during use of the image forming apparatus 100, such as control programs for the image forming apparatus 100 and numerical values required for control. The RAM 93 stores, for example, data necessitated in the course of controlling the image forming apparatus 100 and data temporarily required for control of the image forming apparatus 100. The counter 95 integrally counts the number of printed sheets.

Furthermore, the control section 90 transmits control signals from the CPU 91 to the various portions in the image forming apparatus 100 via the I/Fs 96. Furthermore, from the various portions, signals indicating statuses thereof and input signals are transmitted to the CPU 91 via the I/Fs 96. Examples of the various portions controlled by the control section 90 include the image forming portions Pa to Pd, the main motor 61, the belt driving motor 63, an image input portion 70, a voltage control circuit 71, and the operation section 80.

The image input portion 70 is a receiving portion that receives image data transmitted from a device (not shown) such as a personal computer to the image forming apparatus 100. An image signal inputted from the image input portion 70 is converted into a digital signal, which then is sent out to the temporary storage portion 94.

The voltage control circuit 71 is connected to a charging voltage power supply 72, a developing voltage power supply 73, and a transfer voltage power supply 74 and operates these power supplies based on an output signal from the control section 90. Based on a control signal from the voltage control circuit 71, the charging voltage power supply 72 applies a prescribed charging voltage to the charging roller 20 in each of the charging devices 2*a* to 2*d*. Based on a control signal from the voltage control circuit 71, the developing voltage power supply 73 applies, to the developing roller 21 in each of the developing devices 3*a* to 3*d*, a prescribed developing voltage obtained by superimposing an alternating current voltage on a direct current voltage. Based on a control signal from the voltage control circuit 71, the transfer voltage power supply 74 applies a prescribed transfer voltage to the primary transfer rollers 6*a* to 6*d* and the secondary transfer roller 9.

In the operation section 80, there are provided a liquid crystal display portion 81 and LEDs 82 that indicate various types of states. A user operates a stop/clear button (not shown) of the operation section 80 to stop image formation and operates a reset button (not shown) to reset various settings for the image forming apparatus 100 to default settings. The liquid crystal display portion 81 is configured to indicate a status of the image forming apparatus 100 and to display an image forming situation and the number of printed copies. The various settings for the image forming apparatus 100 are made via a printer driver on a personal computer (not shown).

Figure 4:
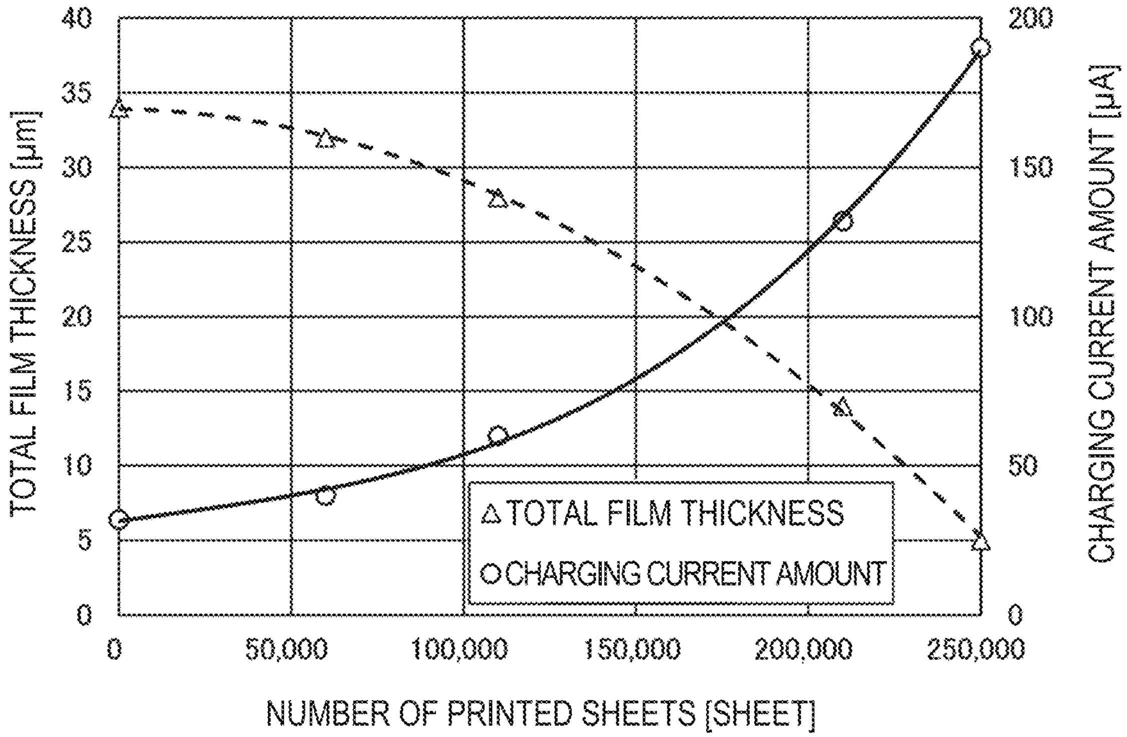
FIG. 4 is a diagram showing variations in total film thickness of a photosensitive layer of a photosensitive drum and in charging current amount of the photosensitive drum with respect to the number of printed sheets.

The following describes an aging process performed by the image forming apparatus 100. FIG. 4 is a diagram showing variations in total film thickness of the photosensitive layer of each of the photosensitive drums 1*a* to 1*d* and in charging current amount i of the each of the photosensitive drums 1*a* to 1*d* with respect to the number of printed sheets. A vertical axis represents the total film thickness (unit: μm) and the charging current amount i (unit: μA), and a horizontal axis represents the number of printed sheets (unit: sheet). In the drawing, a broken line indicates the total film thickness, and a solid line indicates the charging current amount i.

According to this drawing, while the total film thickness of the photosensitive layer decreases with increasing number of printed sheets, the earlier a stage from the start of use of the photosensitive drums 1*a* to 1*d*, the smaller a degree of decrease in the total film thickness of the photosensitive layer. That is, the larger the total film thickness of the photosensitive layer of each of the photosensitive drums 1*a* to 1*d*, the less likely the photosensitive layer is to be abraded. Furthermore, the larger the total film thickness of the photosensitive layer, the smaller a charging current amount required for imparting a given surface potential thereto. Accordingly, during a period of time in which the charging current amount i is low, the photosensitive drums 1*a* to 1*d* are unlikely to be abraded. To solve this issue, in this embodiment, the control section 90 performs the aging process during the period of time in which the charging current amount i is low, and thus the surfaces of the photosensitive drums 1*a* to 1*d* are abraded to a sufficient degree.

Figure 5:
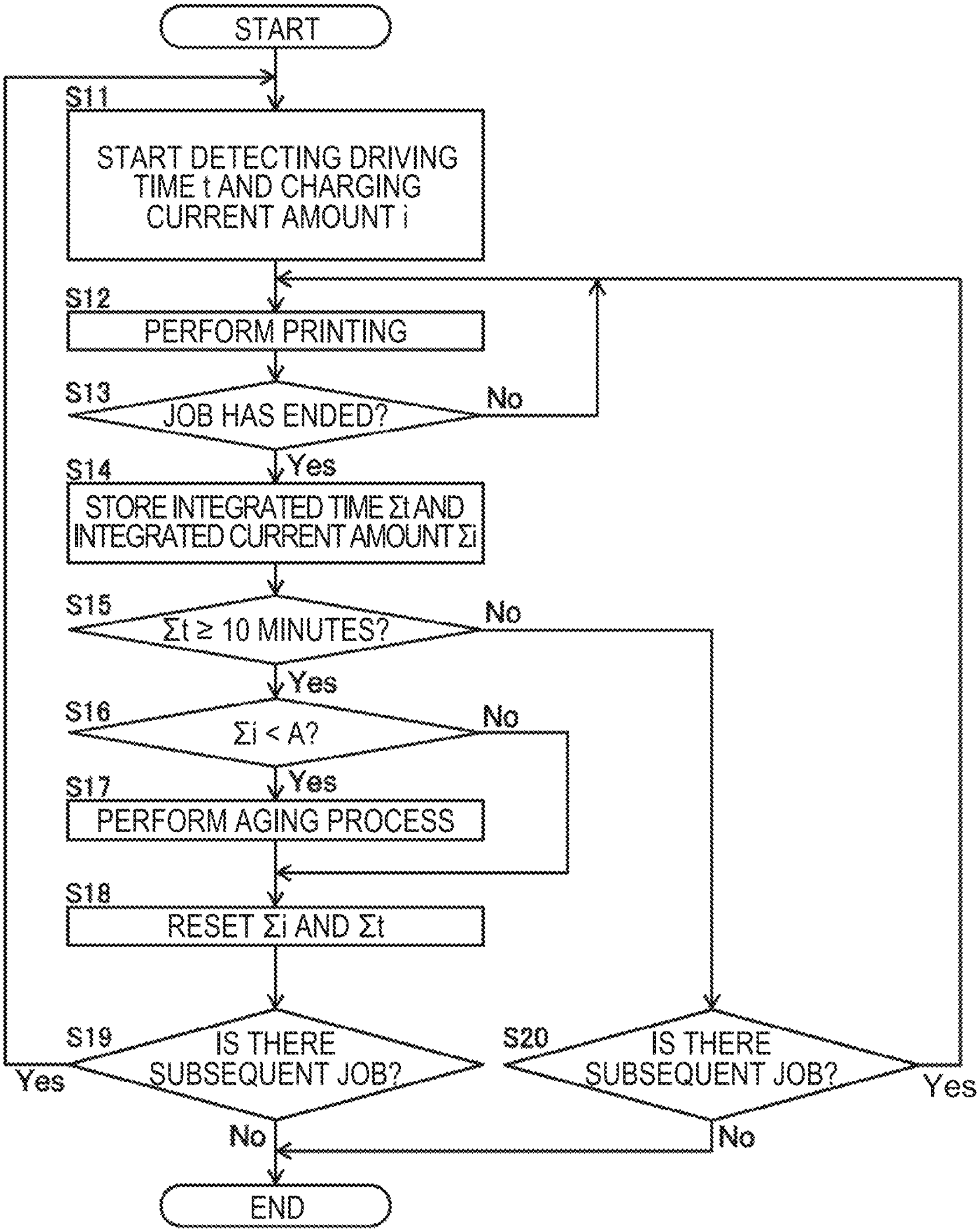
FIG. 5 is a flow chart showing a printing operation including an aging process performed by the image forming apparatus of the embodiment of the present disclosure.

FIG. 5 is a flow chart showing a printing operation including the aging process performed by the image forming apparatus 100. Upon receipt of a printing instruction from the image input portion 70 (see FIG. 3), at step S11, a driving time t (unit: second) and the charging current amount i (unit: A) of the photosensitive drums 1*a* to 1*d* being driven to rotate are started to be measured. At step S12, printing is performed.

At step S13, it is determined whether or not a printing job has been completed. In a case where the printing job has not yet been completed, the processes of steps S12 and S13 are repeatedly performed, while in a case where the printing job has been completed, a transition is made to step S14.

At step S14, an integrated time Σt obtained by integrating values of the driving time t and an integrated current amount Σ*i* obtained by integrating values of the charging current amount i in the integrated time Σt are stored in the RAM 93. While at the end of an initial job, the integrated time Σt has a value equal to that of the driving time t, in a case where a plurality of jobs are performed, the integrated time Et has a value obtained as a sum of values of the driving time t in the plurality of jobs.

At step S15, it is determined whether or not the integrated time Σt has reached a prescribed length of time. Herein, the prescribed length of time is, for example, 10 minutes (600 seconds). In a case where the integrated time Σt has become not less than 10 minutes, a transition is made to step S16, while in a case where the integrated time Σt has not yet reached 10 minutes, a transition is made to step S20.

At step S20, it is determined whether or not there is a subsequent job, and in a case where there is the subsequent job, a transition is made to step S12. Further, the processes of steps S12 to S15 and step S20 are repeatedly performed until the integrated time Et becomes not less than 10 minutes.

When, as a result of performing one or a plurality of jobs, the integrated time Σt has become not less than 10 minutes, at step S16, it is determined whether or not the integrated current amount Σi in the integrated time Σt is lower than a prescribed threshold value A. Herein, the threshold value A is 30,000 μC as will be described later. In a case where the integrated current amount Σi is lower than the threshold value A, a transition is made to step S17.

At step S17, the aging process in which the photosensitive drums 1*a* to 1*d* are driven to rotate in a charged state is performed for a prescribed length of time (for example, 60 seconds). In the case where the integrated current amount Σi is lower than the threshold value A, the charging current amount i is so low that the photosensitive drums 1*a* to 1*d* are unlikely to be abraded. To solve this issue, the aging process is performed so that the surfaces of the photosensitive drums 1*a* to 1*d* are abraded to a sufficient degree, and thus substances adhering thereto can be reliably removed.

In a case where the control section 90 is performing control so as to intentionally decrease a surface potential of a photosensitive drum, the charging current amount i may be temporarily decreased. For this reason, the integrated current amount Σi is used for a comparison with a threshold value, and thus it is possible to avoid a situation where the aging process is performed in response to a temporary decrease in the charging current amount i.

In a case where it is determined at step S16 that the integrated current amount Σi is not less than the threshold value A, a degree of film abrasion of the photosensitive drums 1*a* to 1*d* is large, and thus a transition is made to step S18 without the aging process being performed. At step S18, values of the integrated time Et and the integrated current amount Σi stored in the RAM 93 are reset, and processing is ended.

Next, Table 1 shows results of a test for determining the threshold value A. Test conditions used are as follows. That is, there were used photosensitive drums whose values of the charging current amount i were 30 μA, 50 μA, and 70 μA, and a comparison was made between a case of performing printing without the aging process and a case of performing printing with the aging process performed for 60 seconds. In the table, "G" indicates a state where no white spots and color spots have occurred on an image, and "P" indicates a state where white spots or color spots have occurred on an image.

TABLE 1

| Charging Current Amount i [μA] | Integrated Current Amount Σi [μC] | No Aging Process Performed | Aging Process Performed |
|---|---|---|---|
| 30 | 18,000 | P | G |
| 50 | 30,000 | G | G |
| 70 | 42,000 | G | G |

According to Table 1, when the charging current amount is as low as 30 μA, in the case of not performing the aging process, white spots occur on an image, which means that potentials of the photosensitive drums are not maintained constant. When, however, the charging current amount i has values of 50 μA and 70 μA, even in the case of not performing the aging process, no white spots and color spots occur on an image, which means that the potentials of the photosensitive drums are maintained constant. Based on this, when the charging current amount i has a value of not less than at least 50 μA, i.e., when the integrated current amount Σi in the integrated time Et of 10 minutes is not less than 30,000 C, there is no need to perform the aging process. Accordingly, the threshold value A is set to 30,000 C in the image forming apparatus 100 of this embodiment.

According to this embodiment, the aging process is performed when the integrated current amount Σi in a prescribed length of time is lower than the threshold value A, and thus it is possible to achieve reliable abrasion of the surfaces of the photosensitive drums 1*a* to 1*d* (image carriers) and thus to obtain uniform images.

Furthermore, at the completion of a job, it is determined whether or not the integrated time Σt has reached a prescribed length of time (10 minutes), and when the prescribed length of time has not yet been reached, a subsequent job is performed. Furthermore, when the prescribed length of time has been reached, it is determined whether or not the integrated current amount Σi is lower than the threshold value A, and the integrated time Et and the integrated current amount Σi are reset. Thus, the image forming apparatus 100 can be easily configured to determine whether or not to execute the aging process depending on a value of the integrated current amount Σi in a prescribed length of time as the integrated time Et.

In addition, the present disclosure is not limited to the foregoing embodiment and can be variously modified without departing from the spirit of the disclosure. For example, the present disclosure is applicable not only to a tandem-type color printer as shown in FIG. 1 but also to various types of image forming apparatuses such as a monochrome printer, a monochrome copy machine, a digital multi-functional peripheral, a color copy machine, and a color multi-functional peripheral.

According to the present disclosure, the aging process is performed when an integrated current amount in a prescribed length of time is lower than a threshold value, and thus it is possible to achieve reliable abrasion of surfaces of image carriers and thus to obtain uniform images.

The present disclosure is usable in an image forming apparatus using the electrophotographic process.

What is claimed is:

1. An image forming apparatus, comprising:

an image carrier that includes a photosensitive layer provided on a surface thereof and is driven to rotate;

a charging device that charges the surface of the image carrier;

an exposure device that exposes the surface of the image carrier charged by the charging device to light so that an electrostatic latent image is formed thereon;

a developing device that develops the electrostatic latent image into a toner image;

a transfer portion that transfers the toner image to a recording medium;

a cleaning blade that scrapes off residual toner remaining on the image carrier; and a control section, wherein the control section detects a charging current amount of the image carrier and, when an integrated current amount obtained by integrating values of the charging current amount in a prescribed length of time is lower than a prescribed threshold value, performs an aging process in which the image carrier is driven to rotate in a charged state.

2. The image forming apparatus according to claim 1, wherein at completion of a job, the control section determines whether or not an integrated time obtained by integrating values of a driving time of the image carrier has reached the prescribed length of time, and performs control so that when the integrated time has not yet reached the prescribed length of time, a subsequent job is performed, while when the integrated time has reached the prescribed length of time, it is determined whether or not the integrated current amount has exceeded the threshold value, and the integrated time and the integrated current amount are reset.

3. The image forming apparatus according to claim 2, wherein the image carrier is formed of a positively charged organic photosensitive member.

4. The image forming apparatus according to claim 1, wherein the image carrier is formed of a positively charged organic photosensitive member.

* * * * *